United States Patent [19]
Barnes

[11] 3,737,632
[45] June 5, 1973

[54] RATE ADAPTIVE NONSYNCHRONOUS DEMODULATOR APPARATUS FOR BIPHASE BINARY SIGNALS

[76] Inventor: Roland O. Barnes, 834 South 296th, Federal Way, Wash. 98002

[22] Filed: Mar. 23, 1972

[21] Appl. No.: 237,256

[52] U.S. Cl. ......235/61.11 E, 329/104, 340/174.1 H
[51] Int. Cl. .........G06k 7/10, H03k 9/00, G11b 5/00
[58] Field of Search ................235/61.11 E, 61.11 D, 235/154; 340/347 DD, 174.1 H; 307/261; 328/162; 329/104, 126

[56] References Cited

UNITED STATES PATENTS

| | | | |
|---|---|---|---|
| 3,514,706 | 5/1970 | Dupraz et al. | 340/347 DD |
| 3,597,752 | 8/1971 | Eldert et al. | 340/174.1 H |

*Primary Examiner*—Daryl W. Cook
*Attorney*—Stephen W. Blore, Kenneth S. Karquist, Joesph B. Sparkman et al.

[57] ABSTRACT

A demodulator apparatus is described for demodulating nonsynchronous binary input signals of the two level biphase type having a nonuniform bit rate. The demodulator comprises a reference means including a first digital counter which measures the width of successive input bits and produces time reference signals corresponding thereto so that the magnitude of such reference signal is automatically changed in response to variation in the bit rate. A comparator means including a second counter and discriminator is employed for comparing the reference signal of the preceding input bit against the time interval of the biphase information portion of the next succeeding input bit to determine whether it is a binary one or a binary zero. By employing this dynamic reference technique to compensate for varying bit rates in the nonsynchronous biphase input signal, one embodiment of the demodulator employing sixteen stage binary counters has been operated over a nonsynchronous bit rate range of 10 to 40,000 bits per second where the change in bit rate between adjacent bits can be between +20 and −35 percent.

17 Claims, 5 Drawing Figures

RATE ADAPTIVE NONSYNCHRONOUS DEMODULATOR APPARATUS FOR BIPHASE BINARY SIGNALS

BACKGROUND OF THE INVENTION

The subject matter of the present invention relates generally to the demodulation of nonsynchronous two level digital signals and in particular to a nonsynchronous demodulator apparatus for demodulating biphase binary input signals having a nonuniform bit rate. The demodulator apparatus of the present invention employs the "dynamic reference" technique disclosed in copending U. S. Pat. application, Ser. No. 158,779 of R. O. Barnes, filed July 1, 1971, and entitled RATE ADAPTIVE NONSYNCHRONOUS DEMODULATOR APPARATUS. With this dynamic reference technique a timing reference signal derived from each input bit is compared with the width of the next succeeding input bit to determine whether it is a binary one or zero. As a result, the time reference signal is automatically corrected for each bit to compensate for any changes in the width of the input bits due to variations in the bit rate so that there is no accumulation of timing errors in spite of significant variations in the input bit rate.

While the demodulator apparatus of the present invention can be used to demodulate any nonsynchronous biphase binary signals regardless of its source, it is especially useful for such signals when they have a widely varying bit rate as produced by manually operated readers of binary information. One such reader might be an optical reader including a light source and a photocell which is scanned manually across alternate bars of light reflecting and nonreflecting material arranged in a biphase binary code. This reader can be used at the checkout stand of a department store or supermarket to produce a nonsynchronous biphase binary signal corresponding to the price of an item being purchased by scanning a binary coded label on such item. The nonsynchronous biphase signal is demodulated and transmitted to a digital computer which can be programmed to add the prices of all items purchased, check the credit card of the purchaser, and indicate whether the sale can be made as well as making appropriate changes in the inventory of the store. Such an automated supermarket has the advantage of eliminating errors by the cash register operator in entering the price of an item, speeding up the checkout procedure, reducing bad debts and providing an accurate up-to-date inventory.

As indicated in greater detail in my copending U. S. patent application Ser. No. 158,779, a nonsynchronous two level binary signal demodulator of the type of the present invention has several advantages over synchronous demodulators which will not be repeated here. In addition, the present demodulator enables biphase binary signals to be used rather than pulse duration modulated binary signals so that a greater amount of data can be transmitted within a given bandwidth. Thus, approximately 50% more data can be written and read out with biphase signals instead of pulse duration modulated signals using the same space and mark size.

Unlike pulse duration modulated signals, biphase signals have binary one and binary zero bits of the same width determined by the interval between two adjacent regular level transitions in the biphase signal, and the binary identification of such bits is accomplished by the presence or absense of irregular transitions between such regular transitions. For example, a biphase mark signal has regular transitions at the opposite ends of each bit and an irregular transition in the middle of one bits and no transition in the middle of zero bits. Biphase space signals have an irregular transition in the middle of zero bits and no transition in the middle of one bits. However, biphase level signals are always balanced in that one-half of the bit is high and the other half low so that regular transitions always occur in the middle of both one and zero bits and such bits are identified by negative going regular transitions for one bits and positive going regular transitions for zero bits. It should be noted that the biphase level signal is displaced one-half bit to the right of biphase mark and biphase space signals.

It is, therefore, one object of the present invention to provide an improved demodulator apparatus for demodulating nonsynchronous two level biphase binary signals of varying bit rate.

Another object of the present invention is to provide such a demodulator apparatus in which a dynamic time reference technique is employed to compensate for the varying bit rates of the biphase input signal by comparing the width of the bit against a time reference signal derived from the width of the immediately preceding bit.

A further object of the invention is to provide such a demodulator apparatus which operates in a simple, efficient and accurate manner employing a first digital counter to provide the time reference signal, a second digital counter for comparing such reference signal with the width of the next succeeding bit and for operating a discriminator circuit which separates binary information and timing information from the input signal and produces a binary output signal of different codes than the biphase input signal.

Still another object of the invention is to provide such a demodulator apparatus in which a third digital counter is employed for comparing the time reference signal with the space between bit transitions to determine the end of a group of input bits corresponding to a word or character and producing a corresponding end of word output pulse and causing all of the counters to be reset.

An additional object of the present invention is to provide such a demodulator apparatus in which each group of input bits includes a preamble bit at the beginning of the group which provides the first time reference signal for comparison with the first information bit of such group, and a termination space at the end of the group for comparison with the last time reference signal to produce an "end of word" pulse output, and the demodulator also produces a "begin" pulse output at the end of the preamble bit, an "in process" signal output beginning with the first information bit and ending with the termination space, and a "bit sync" pulse output at the end of each information bit.

BRIEF DESCRIPTION OF DRAWINGS

Other objects and advantages of the present invention will be apparent from the following detailed description of a preferred embodiment thereof and from the attached drawings of which.

BRIEF DESCRIPTION OF PREFERRED EMBODIMENT

Figure 1:
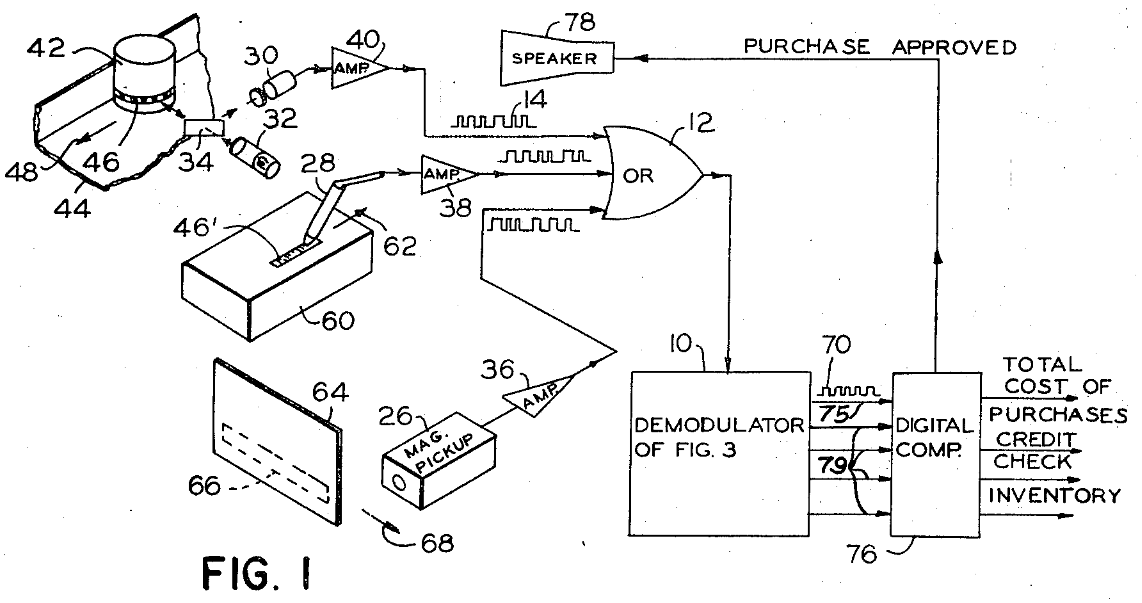
FIG. 1 is a schematic diagram of a checkout system for a department store, supermarket or the like employing the nonsynchronous demodulator apparatus of the present invention.
Figure 2:
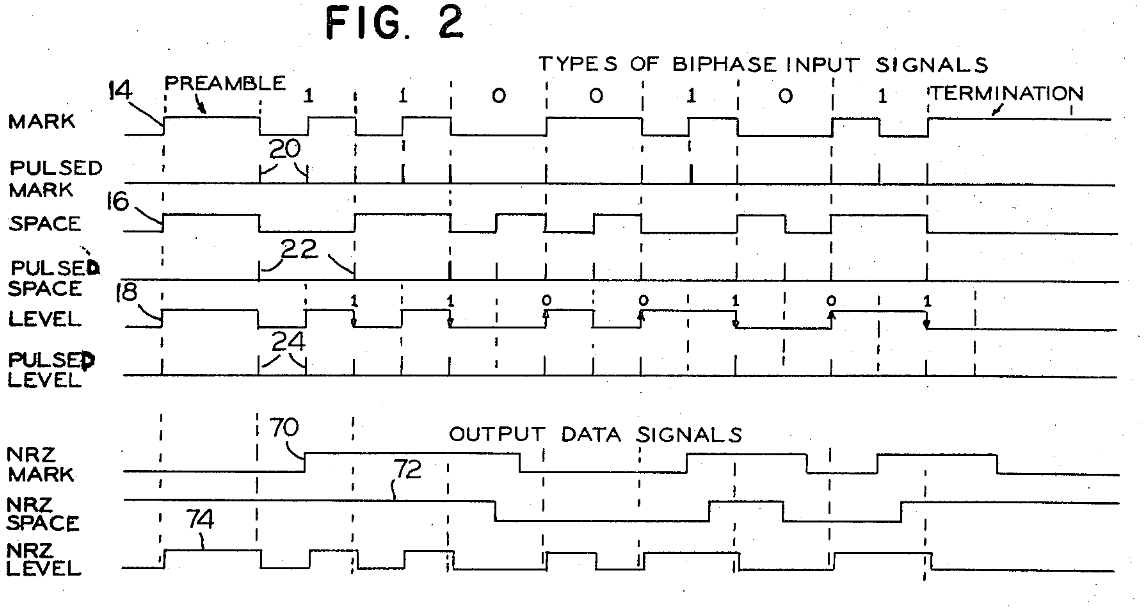
FIG. 2 is a schematic diagram of different types of biphase input signals and corresponding output signals of nonreturn to zero type which can be produced by the demodulator apparatus.
Figure 3:
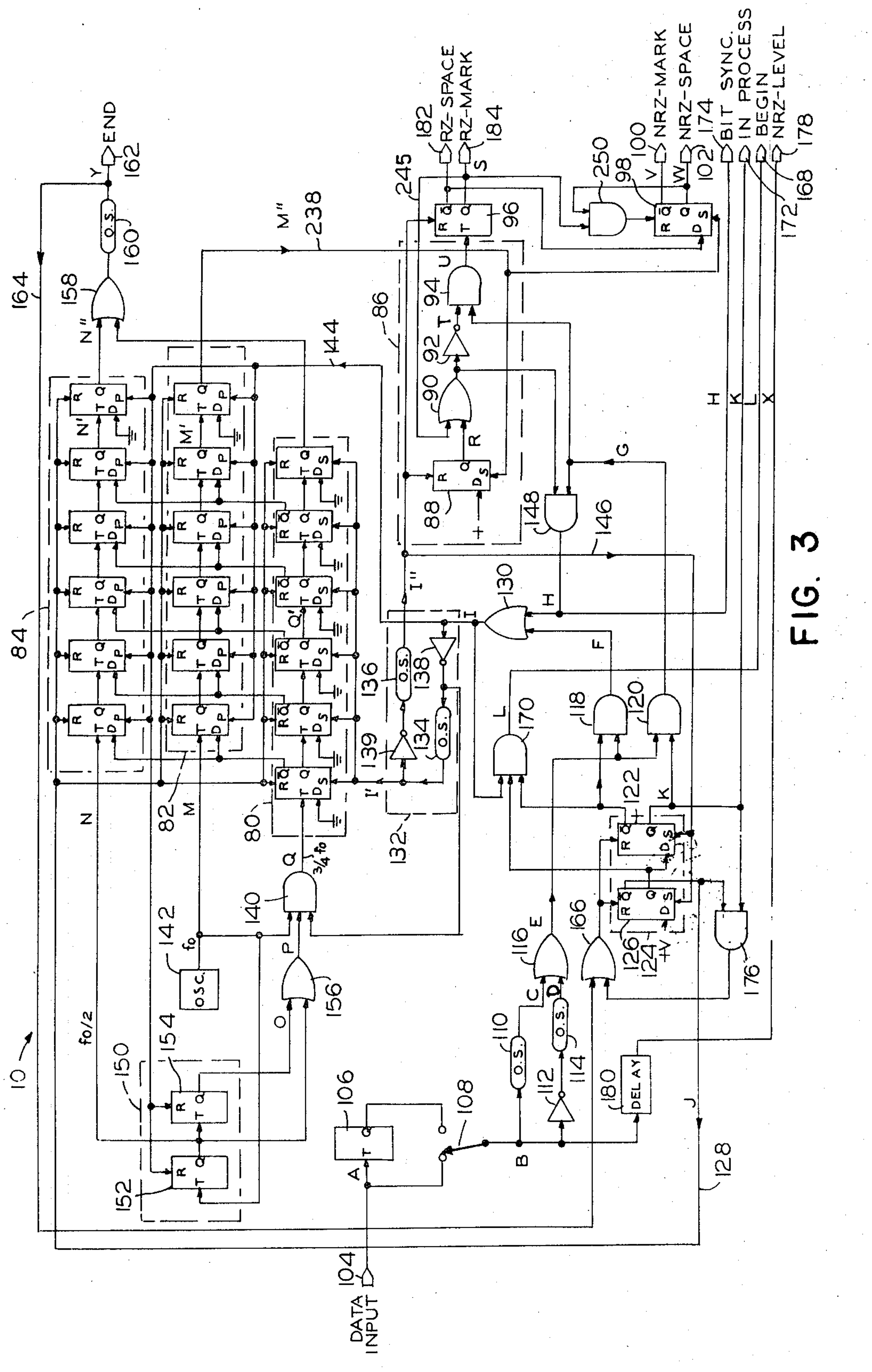
FIG. 3 is a schematic diagram of the electrical circuit of one embodiment of the demodulator apparatus of the present invention.

As shown in FIG. 1, a nonsynchronous demodulator apparatus 10, made in accordance with the present invention and shown in greater detail in FIG. 3, may be employed in a supermarket checkout system. The input of the demodulator 10 is connected to the output of an Or gate 12 for applying a two level series binary input signal of biphase modulated type thereto. The biphase input signal may be one of the types shown in FIG. 2 including a mark type signal 14, a space type signal 16, a level type signal 18, a pulsed mark signal 20, a pulsed space signal 22 and a pulsed level signal 24. Each of these biphase input signals has a waveform corresponding to a group of bits which include a preamble bit, seven information bits of 1100101 binary values, and a termination bit. Of course, a different number of information bits can be employed in each word group other than the seven bits of the above example.

The biphase input signals are supplied to the Or gate 12 by three different binary information readers including a magnetic pickup reader 26, a movable light pen reader 28 and a fixed photoelectric reader including photocell 30, light source 32, and partially reflecting mirror 34. The outputs of these readers are each connected through inverter amplifier and clipper circuits 36, 38 and 40 to the inputs of the Or gate 12. The readers produce biphase signals of the same amplitude, but different bit rates which vary due to changes in the speed of relative movement between the reader and the scanned record having the binary information thereon. For example, when the demodulator apparatus of the present invention is employed as part of a checkout system used at a supermarket, department store or the like, one of the input signals may be provided by the fixed photoelectric reader including light source 32 which directs a beam of light onto the side of a can 42 or other regularily shaped item being purchased as it slides along a checkout counter top 44 so that the light is reflected from a label 46 having binary information recorded thereon back to the mirror and on to the photocell 30. The binary indicia on label 46 is positioned at a fixed distance from the bottom of the can. Thus, when the can 42 is moved by hand along the counter 44 in the direction of arrow 48, a light beam emitted by source 32 and passing through the partially reflective mirror 34 scans the entire length of the binary indicia 46 to produce a corresponding electrical signal at the output of photocell 30 that is transmitted through the amplifier and clipper circuit 40. In addition to the linear movement 48, the can 42 may be simultaneously rotated to maintain the scanned portion of the label substantially perpendicular to the light beam for better resolution. However, in either case, the scanning speed changes and, therefore, the bit rate of the biphase input signal varies. Thus, the demodulator circuit 10 demodulates non-synchronous biphase binary signals in a manner hereafter described.

Figure 1A:
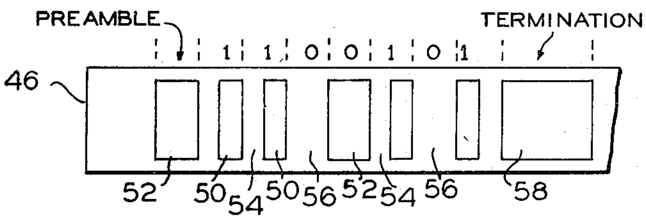
FIG. 1A is an enlarged view of a label containing biphase digital information which may be employed in the system of FIG. 1.

As shown in FIG. 1A, the binary indicia on label 46 may be in the form of alternate bars of reflecting and nonreflecting material of different widths. Thus, in order to produce the biphase mark signal 14, the binary indicia is formed by nonreflective bar 50 of width X and nonreflective bars 52 of width 2X which are separated by light reflective bars 54 of width X and reflective bars 56 of width 2X, along with a wide bar 58 having a width of 3X at the end of the word group producing the termination space in the mark signal.

The movable light pen reader 28 is employed for irregularly shaped packages 60 and is moved in a direction of arrow 62 across a label 46' of binary indicia provided on such package. As a result, a photoelectric cell within the light pen 28 produces another nonsynchronous binary signal of biphase type which is also applied to demodulator 10 through inverter amplifier and clipper circuit 38. In order for a customer to charge the cost of the items purchased to his bank account, a credit card 64 including a magnetic strip 66 with binary information, such as the customer's name and checking account number recorded thereon is moved manually in a guide slot in the direction of arrow 68 past the magnetic pickup head of reader 26. Reader 26 also produces a nonsynchronous binary input signal of biphase type which is applied through amplifier 36 to demodulator 10.

Figure 4:
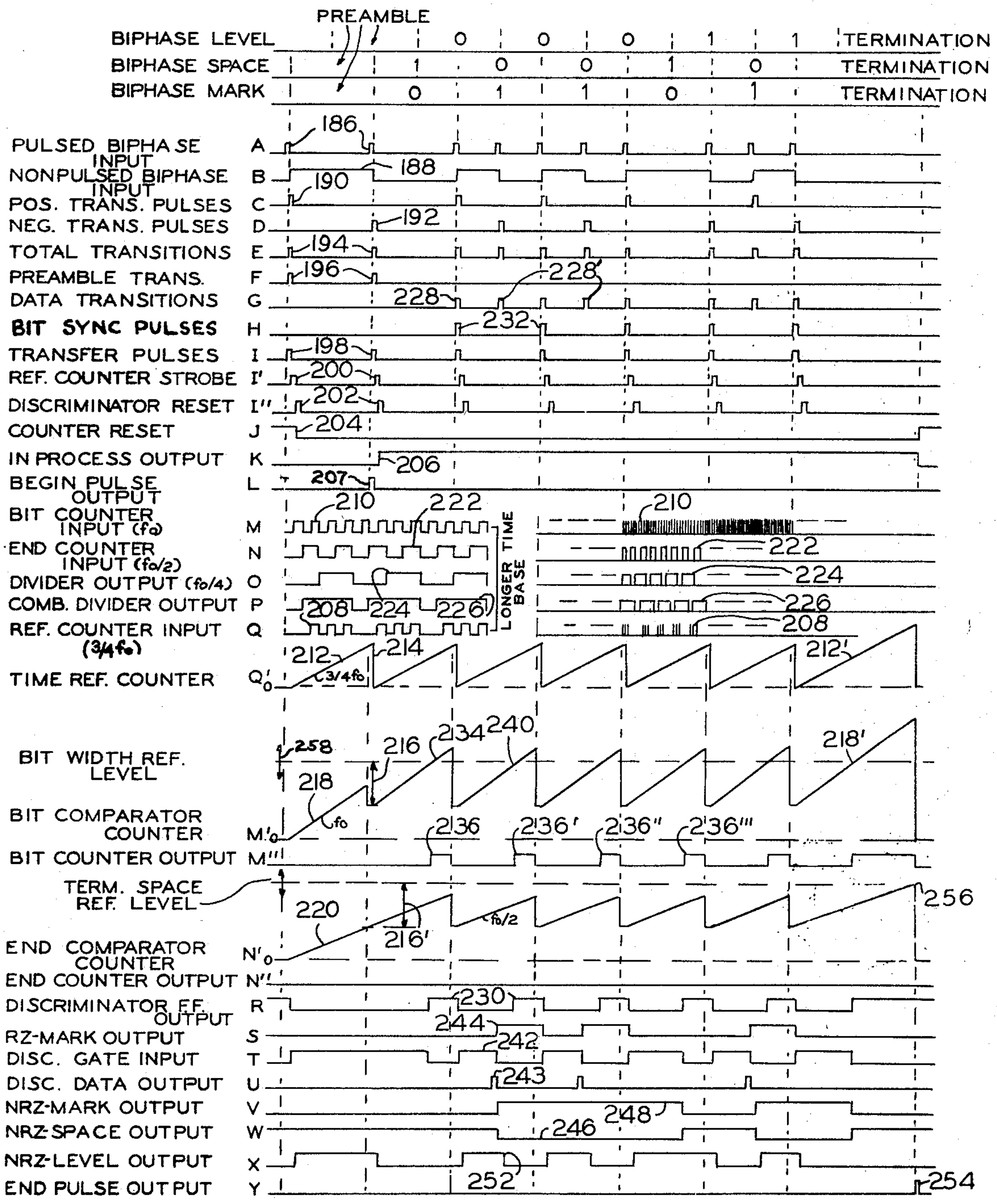
FIG. 4 shows the electrical signal waveforms applied to and produced in the circuit of FIG. 3.

The demodulator circuit 10 demodulates the nonsynchronous biphase binary input signals into binary output signals of different code such as nonreturn to zero type (NRZ) binary signals. Thus, demodulation of the biphase signals 14 to 24 of FIG. 2 produces NRZ mark signal 70, NRZ space signal 72 or NRZ level signal 74 which are supplied to one input 75 of a digital computer 76 or other information processing unit. The computer determines the price of the item purchased from the binary coded input signal, adds the total cost of the purchases, and charges such cost to the bank account of the customer after making a credit check with the bank. In addition, a loud speaker 78 or other indicator such as a flashing light adjacent the ckeckout stand is actuated by the computor to signal the checker that the purchase has been approved. At the same time, another signal may be supplied to an inventory control unit not shown to update the inventory records by subtracting the items purchased. In addition to the demodulated NRZ output signals 70, 72 and 74, the demodulator 10 produces for each word group "Bit Sync" pulses, a "Begin" pulse, an "In Process" signal and an "End" pulse which are shown in FIGS. 3 and 4 and are applied to four other inputs 79 of the computer.

One embodiment of the nonsynchronous demodulator apparatus 10 is shown in FIG. 3 and has three binary digital counters including a time reference counter 80, a bit comparator counter 82, and an end of word comparator counter 84. The counters have six stages each in the form of a bistable multivibrator or flip-flop circuit having its trigger input T, connected to the true output, Q, of the preceding stage. A discriminator circuit 86 is provided which is connected to the output of the bit comparator counter 82 which causes the discriminator to separate bit width timing pulses and binary information pulses from the input data pulses, G, of FIG. 4 in order to transmit the timing pulses H to the timing reference counter and only the information pulses as the data output U of the demodulator in a manner hereafter described. The discriminator 86 includes a flip-flop circuit 88 connected at its Q output to one input of an Or gate 90 and connected at its strobe input, S, to the output of counter 82. The output of the Or gate is connected through an inverter amplifier 92 to one input of an And gate 94 whose other input is connected to the source of the input data pulses. The output of the And gate is connected to the T input of an output memory flip-flop 96 for supplying a binary data output pulse thereto and producing return to zero (RZ) marks and space output signals on its Q output and $\overline{Q}$ output respectively. Flip-flop 96 functions as a memory for such binary data output signal and has its false output $\overline{Q}$ connected to the data input D of another output flip-flop 98 which produces a nonreturn to zero (NRZ) mark output signal on its $\overline{Q}$ output terminal 100 and produces a NRZ space output signal on its Q output terminal 102.

The biphase binary input signal is applied to the demodulator at an input terminal 104. Pulsed biphase input signals, A, are transmitted through a flip-flop 106 and converted to nonpulsed biphase signals when switch 108 is moved to the right position opposite from that shown. Nonpulsed biphase signals, B, are transmitted directly to switch 108 in the left position shown. The biphase input signal is applied by switch 108 to trigger a monostable multivibrator or "one-shot" circuit 110 on the positive transitions of such input signal and is also transmitted through an inverter amplifier 112 to trigger another one-shot 114 with the negative transitions of the input signal. The one-shots both produce narrow pulses C and D of about 0.5 microseconds width. The input pulses C and D are transmitted through an Or gate 116 as a combined signal E to one input of each of a pair of And gates 118 and 120. The other inputs of And gate 118 and 120 are connected, respectively, to the $\overline{Q}$ and Q outputs of a flip-flop 122 forming the second stage of an input memory circuit 124. The first stage of the input memory circuit consists of another flip-flop 126 having its Q output connected to the data input D of the second flip-flop 122. During its quiescent state, the input memory circuit 124 produces a positive going reset signal J on the $\overline{Q}$ output of flip-flop 126 which is transmitted through a conductor 128 to the reset terminals R of all of the stages of the three counters 80, 82 and 84 to reset such counters to zero before the beginning of each binary word group in the biphase input signal. At this time, the Q output of the flip-flop 126 is low and is applied to the D input of flip-flop 122 whose Q output is also low, thereby disabling And gate 120, and whose $\overline{Q}$ output is high, thereby enabling And gate 118. As a result, the first two input pulses supplied from the output of Or gate 116 are transmitted only through And gate 118 to provide two preamble transition pulses F. These preamble transition pulses F correspond to the positive and negative transitions at the beginning and end of the preamble bit in the biphase input signal. The preamble transition pulses are transmitted from the output of And gate 118 through an Or gate 130 to a sequential control circuit 132.

The sequential control circuit 132 includes two one-shot multivibrators 134 and 136 and two inverter amplifiers 138 and 139. The output pulses I of Or gate 130 are transmitted through inverter 138 as negative pulses to one input of And gate 140. The And gate 140 normally transmits standard frequency pulses produced by an oscillator 142 to the first stage of the time reference counter 80. The inverted output pulses of inverter 138 disable such And gate to stop further counting by counter 80. The output pulses I of Or gate 130 also function as transfer pulses which are transmitted through conductor 144 to the preset terminals P of the flip-flop circuits forming the stages of counters 82 and 84 to transfer the one's complement of the time reference signal previously counted and stored in counter 80 from the $\overline{Q}$ outputs of its first five stages in parallel to the data inputs D of the corresponding stages of counters 82 and 84. After this transfer, the one-shot multivibrator 134 of the sequential control circuit 132 is triggered on the positive going trailing edge of the negative pulse at the output of inverter 138, and applies a delayed reset pulse I' to the strobe inputs S of the time reference counter 80 which resets such counter to zero because the data inputs D of its stages are all grounded. This delayed reset pulse I' is also transmitted through inverter 139 to trigger one-shot multivibrator 136 on its positive going trailing edge to produce a further delayed reset pulse I'' which is applied to the reset terminals of flip-flops 88 and 96 in the discriminator 86.

The descriminator reset pulse I'' is also transmitted through conductor 146 to the strobe inputs S of the flip-flops 122 and 124 of the input memory. This causes the Q output of flip-flop 126 to go positive and its $\overline{Q}$ output to go negative which terminates the reset signal applied through conductor 128 to counters 80, 82 and 84 and enables such counters to begin counting shortly after the beginning of the preamble bit of each word group of biphase binary input pulses B. However, the receipt of the first reset pulse I'' has no effect on flip-flop 122 because its data input D is low at this time.

The second reset pulse I'' applied to the strobe terminal of flip-flop 122 causes it to produce a positive going Q output and a negative going $\overline{Q}$ output because its data input D then has applied thereto a positive Q output of flip-flop 126. This disables And gate 118 and enables And gate 120 so that the input pulses E are thereafter transmitted from the output of And gate 120 as data transition pulses G to the input of an And gate 148 and from its output to Or gate 130. The other input of And gate 148 is connected to the output of the Or gate 90 in the discriminator circuit 96. The And gate 148 is enabled by the discriminator circuit 86 only during the regular transitions corresponding to the beginning and end of each data bit of the biphase input signal B to transmit timing pulses H through And gate 148 to the sequential control circuit 132. Thus, the And gate 148 is not enabled during the irregular transitions corresponding to the information portion of such data bits.

The oscillator 142 applies standard frequency pulses of frequencies $f_o$, $f_{o/2}$ and $3/4 f_o$, respectively, to the trigger inputs, T, of the first stages of the counters 80, 82 and 84. A frequency divider 150, including a pair of flip-flops 152 and 154 is provided to divide the frequency $f_o$ of the output pulses of oscillator 142 into standard frequency pulses of frequency $f_{o/2}$ which are transmitted from the Q output of flip-flop 152 to the trigger input T of the first stage of the end comparator counter 84. The divider 150 also transmits gating pulses through an Or gate 156 to cause the And gate 140 to transmit standard frequency pulses of frequency $3/4f_o$ to the first stage of the time reference counter 80. Thus, the flip-flop 152 of divider 150 is connected at its Q output to the trigger input of the flip-flop 154, to the trigger input of the first stage of the end comparator counter 84, and to one input of the Or gate 156. The other input of the Or gate 156 is connected to the Q output of flip-flop 154. The output of such Or gate is connected as an enabling input to And gate 140 whose other two inputs are connected to the outputs of oscillator 142 and inverter 138. The first output pulse of oscillator 142 triggers flip-flop 152 and produces a positive Q output which triggers flip-flop 154 to cause it to produce a positive Q output. The second output pulse of the oscillator reverts flip-flop 152 and switches its Q output to a low voltage or zero state, but leaves the second flip-flop 152 in its triggered state. The third oscillator pulse again triggers flip-flop 152 to produce a positive Q output which reverts flip-flop 154 to terminate its Q output. The fourth oscillator pulse reverts flip-flop 152 and leaves flip-flop 154 in its reverted state so that at this time no enabling pulse is transmitted through Or gate 156 to And gate 140. Therefore, And gate 140 transmits the first three oscillator pulses and blocks the fourth oscillator pulse so that the output signal Q of such And gate has a frequency of $3/4f_o$.

When the termination space of each group of bits in the biphase input signal applied to input terminal 104 is received, the end comparator counter 84 produces an output pulse N which is transmitted through an Or gate 158 to trigger a one-shot multivibrator 160 and produce an end of word pulse Y at an output terminal 162. This End of Word pulse is also transmitted through a conductor 164 to an Or gate 166. The output of Or gate 166 resets flip-flops 126 and 122 of the input memory circuit 124 to their original quiescent state.

Following the preamble bit, a Begin pulse L is transmitted to an output terminal 168 at the beginning of the data portion of the biphase binary input signal from the output of And gate 170. One of the three inputs of And gate 170 is connected to the Q output of flip-flop 126, another input is connected to the $\overline{Q}$ output of flip-flop 122 and the third input is connected to the output of Or gate 130. Thus, the And gate 170 is not rendered conducting to produce the begin pulse L until after the second input pulse is transmitted through And gate 118 and Or gate 130 to And gate 170 at the end of the preamble portion of the binary biphase input signal. Thus, only then are both the Q output of flip-flop 126 and the $\overline{Q}$ output of flip-flop 122 both positive so all inputs of the And gate 170 are positive. Immediately thereafter the delayed reset pulse I'' transmitted from the output of one-shot multivibrator 136 corresponding to the second pulse through Or gate 130 is transmitted through conductor 146 to strobe flip-flop 122 with a positive data input supplied by flip-flop 126. This switches the $\overline{Q}$ output of flip-flop 122 to low or in a zero state and disables the And gate 170.

Flip-flop 122 is maintained in that state until the flip-flops 122 and 126 are both reset by the end pulse transmitted through Or gate 166. When the Q output of flip-flop 122 is maintained in a positive state, it supplies an In Process signal K to an output terminal 172. A bit sync output signal H is transmitted from the output of And gate 148 to an output terminal 174 at the end of each binary information bit of the input signal.

A "forbidden state reset" And gate 176 is provided for the input memory 124. Such gate has one input connected to the $\overline{Q}$ output of flip-flop 126 and its other input connected to the Q output of flip-flop 122. The output of And gate 176 is connected through Or gate 166 to the reset terminals of both of flip-flops 122 and 126. When the flip-flops 122 and 126 are put in the forbidden state of a high $\overline{Q}$ output for 126 and a high Q output for 122, And gate 176 resets the flip-flops.

In addition to the nonreturn to zero mark output 100 and the nonreturn to zero space output 102, a nonreturn to zero level output signal may be provided at an output terminal 178 connected through a delay means 180 to the output of switch 108. As a result, NRZ level signal is delayed about one microsecond with respect to biphase input signal B. The delay provides sufficient memory to present the one or zero level of the input signal to the output terminal NRZ level 178 until the bit sync signal 232 has passed. Also, if desired, a return to zero (RZ) space signal output terminal 182 and a return to zero mark signal output terminal 184 may be provided at the $\overline{Q}$ and Q terminals, respectively, of the output memory flip-flop 96.

The electrical signal waveforms produced by the demodulator apparatus of FIG. 3 are shown in FIG. 4 and the position of such waveforms in the demodulator is indicated on FIG. 3 by the letters corresponding thereto. Pulsed biphased input signals 186 applied to input terminal 104 are transmitted to point A to trigger flip-flop 106 on the negative going trailing edge portions of such input pulses to produce a nonpulsed biphase input signal 188 at the Q output of such flip-flop. This input signal 188 is transmitted through switch 108 to point B in the right position of such switch. When the input signal applied to input terminal 104 is a nonpulsed biphase input signal, like signal 188, the switch 108 is moved to the left position shown to transmit such input signal directly to point B. The positive going transitions of the biphase input signal 188 trigger the one-shot multivibrator 110 to produce positive transition pulses 190 to point C while the negative transitions of input signal 188 are inverted by inverter 112 and trigger one-shot multivibrator 114 to produce negative transition pulses 192 at point D. These positive and negative transition pulses of 0.5 microseconds width are transmitted through Or gate 116 to provide total transition pulses 194 at point E. The first two total transition pulses 194 are transmitted through And gate 118 to provide preamble transition pulses 196 at the beginning and end of the preamble period of the biphase input signal because at this time the $\overline{Q}$ output of flip-flop 122 in high and enables And gate 118. These preamble transition pulses 196 are transmitted through Or gate 130 to form the first two transfer pulses 198 at point I.

The transfer pulses 198 are inverted and applied to And gate 140 to momentarily prevent standard frequency signals from being applied to the input stage of time reference counter 80 so that it stops counting. The transfer pulses 198 are applied to the present input terminal P of each stage of counters 82 and 84 causing the complement of a time reference voltage, corresponding to the width of the previous bit and stored in counter 80, to be transferred from the $\overline{Q}$ outputs of the stages of counter 80 to the stages of counters 82 and 84 through their data inputs D. However, it should be noted that the last stages of counters 82 and 84 are preset to zero by such transfer pulses because their data input terminals D are grounded. It should also be noted that the first of such transfer pulses 198 is ineffective because of an overriding reset voltage level being applied at that time by the $\overline{Q}$ output of flip-flop 126 to the reset input terminal R of all stages of counters 82 and 84.

The inverted transfer pulses 198 are also applied to one-shot multivibrator 134 such that the positive going trailing edge of such inverted pulses triggers such multivibrator to produce reference counter strobe pulses 200 at point I'. The strobe pulses 200 strobe all the stages of the time reference counter 80 to zero because the data input terminals D of such stages are all grounded. The 0.5 microsecond duration of strobe pulses 200 is equal to the recovery period of one shot 134.

The reference counter strobe pulses 200 are also transmitted through inverter 139 to trigger one shot multivibrator 136 and produce delayed reset pulses 202 of 0.5 microsecond width. The reset pulses 202 are employed to reset the discriminator flip-flop 88 and output storage flip-flop 96 and are also transmitted through conductor 146 to the strobe terminals of flip-flops 122 and 126 of the input memory circuit 124. The first reset pulse 202 triggers flip-flop 126 and terminates a counter reset signal 204 previously produced at point J on conductor 128 by the $\overline{Q}$ output terminal of such flip-flop, thereby enabling the counters 80, 82 and 84 to begin counting. The second reset pulse 202 triggers flip-flop 122 because the Q output of flip-flop 126 is high at this time. As a result, an In Process signal 206 is produced at point K on the Q output of flip-flop 122 and transmitted to output terminal 172, thereby signifying the beginning of binary data portions of the biphase input signal 188. A Begin pulse 207 is produced at point L on output terminals 168 by And gate 170 when the second transfer pulse 196 is received because the Q output of flip-flop 126 and the $\overline{Q}$ output of flip-flop 122 are positive at this time.

Between the first two time reference counter strobe pulses 200 corresponding to preamble transition pulses 196, the time reference counter 80 counts standard frequency pulses 208 produced at the output of And gate 140 which have a frequency of $3/4f_o$, where $f_o$ is the frequency of oscillator pulses 210. This produces a timing reference ramp voltage signal 212 in the counter 80. The time reference signal reaches a maximum amplitude reference voltage 214 corresponding to the time width of the preamble portion forming the first bit of the biphase input signal 188. The complement of the time reference voltage 214 represented by double head arrows 216 and 216' is transferred to the bit counter 82 and the end counter 84 by the second transfer pulse 198 for comparison with the width of the next bit of the biphase input signal 188 counted by such counters. Thus, a bit counter ramp signal 218 and an end counter ramp signal 220 are produced by counters 82 and 84, respectively, which both start at zero at the beginning the preamble period but for the following data bits such ramp signals start at the level of the transferred reference voltage 216 and 216' corresponding to the width of the immediately preceding bit. This provides a dynamic time reference technique which compensates for the varying bit rates of nonsynchronous biphase signals in a similar manner to that described in my previously filed copending United States patent application Ser. No. 158,799 referred to above. It should be noted that the reference voltage levels 216 and 216' may vary for successive bits because of changes in bit rate since then the width of the preceding bit will not be the same as the next successive bit, even though this has not been shown in FIG. 4.

The slopes of the ramp signals 212, 218 and 220 produced by the counters 80, 82 and 84 are different because the input pulses applied to such counters are of different frequencies. Thus, constant frequency pulses 222 are applied to the input of counter 84 with a frequency $f_{o/2}$, one-half that of the oscillator pulses 210 due to the operation of the frequency divider flip-flop 152. However, the constant frequency pulses 208 applied to the time reference counter have a frequency of $3/4f_o$. The frequency divider output pulses 224 produced at point o on the Q output of flip-flop 154 are combined with the pulses 222 to provide a combined gating pulse 226 at the output of Or gate 156 which causes the And gate 140 to transmit three out of every four oscillator pulses 210 to produce the signal 208. In order to show signals 208, 210, 222, 224 and 226 in their proper time relationship, the left hand portion of these signals has been shown on a longer time base than the other signals in FIG. 4, while the right hand portion of such signals is shown on the same time base as such other signals.

The In Process signal 206 produced at the Q output of the flip-flop 122 enables And gate 120 to transmit data transition pulses 228 after the end of the preamble portion of the biphase input signal since the And gate 118 is disabled then. The data transition pulses 228 are applied to one input of And gate 148 whose other input is enabled by a discriminator output signal 230 at point R on the Q output of the flip-flop 88 in the discriminator 86. As a result, a bit sync output signal 232 is produced at point H on the output of And gate 148 which includes only regular data transition pulses occurring at the beginning and end of each bit. Thus, the output signal of the And gate 148 does not include the irregular data transition pulses 228' occurring, for example, in the middle of the one bits of the biphase mark input signal. These regular data transition pulses 232 are transmitted through the Or gate 130 as timing pulses which provide corresponding transfer pulses 198, reference counter strobe pulses 200, and discriminator reset pulses 202. Thus, the discriminator output signal 230 of the flip-flop 88 begins when the bit comparator counter ramp voltage 218 crosses the time reference voltage level 216 at point 234 and produces a bit counter output signal 236 at the Q output of the last stage of counter 82. This bit counter output 236 is transmitted through conductor 238 to the strobe terminals of flip-flop 88 and flip-flop 98 to produce the discriminator output signal 230. the discriminator output signal 230 is terminated in response to the production of the third and succeeding reset pulses 202 which reset flip-flop 88 and and thereby disables the And gate 148 so that the data transition pulses 228 are not transmitted therethrough until the next bit counter signal crossover 240. In this manner the irregularly occurring data transition pulse 228' is blocked. This means that the pulses produced at the output of Or gate 130 and transmitted through inverter 138 to the time reference counter 80 cause such counter to count during the entire time period between the beginning and end of each bit.

The discriminator flip-flop output signal 230 is transmitted through Or gate 90 and inverter 92 to provide a gating signal 242 which is applied to one input of the And gate 94 thereby enabling such And gate during the period between the flip-flop output pulses 230. As a result, only the irregular data transition pulses, such as pulse 228', are transmitted through And gate 94 as the discriminator data output pulses 243 which trigger output memory flip-flop 96 on the trailing edge of such pulses. Flip-flop 96 produces return to zero (RZ) mark output signal 244 on the Q output of such flip-flop. The RZ mark output signal 244 is also transmitted through conductor 245 to the other input of the Or gate 90 to enable gate 148 and disable gate 94 for the next regular data transition pulse 228.

A nonreturn to zero (NRZ) space data output signal 246 is produced at point W on the Q output of flip-flop 98 because an inverted signal, corresponding to RZ mark signal 244 is transmitted for the $\overline{Q}$ output of flip-flop 96 to the data terminal of flip-flop 98 and the bit counter output 236 is applied to the strobe terminal of flip-flop 98. At the same time an inverted NRZ mark data output signal 248 is produced at point V on the $\overline{Q}$ output of flip-flop 98. It should be noted that the NRZ space output signal 246 is quiescently high and is reset low by the RZ mark output 244 transmitted through an And gate 250 to the reset terminal of flip-flop 98. The other input of And gate 250 is connected to the Q output of flip-flop 98 which is quiescently positive to enable such And gate. When the second and third bit counter output pulses 236' and 236'' are received at the strobe input of flip-flop 98, they have no effect on the state of such flip-flop because the $\overline{Q}$ output of flip-flop 96 applied to the data terminal of flip-flop 98 is negative since it is the inverse of RZ mark signal 244. However, when the fourth bit counter output pulse 236''' occurs, the $\overline{Q}$ output of flip-flop 96 is positive, thereby causing flip-flop 98 to be strobed to produce a positive going NRZ space data signal 246 at output terminal 102.

The discriminator 86 produces data output pulses 243 at the output of And gate 94 corresponding to each irregular transition of the biphase input signal 188 which produce data transition pulses 228' representing one bits in a biphase mark input signal and zero bits in a biphase space input signal, as shown at the top of FIG. 4. However, the nonreturn to zero space and mark signals 246 and 248 only have transitions when the next successive data bit is of a different binary type from that of the preceding data bit. In addition, a nonreturn to zero level output data signal 252 may be provided at output terminal 178 merely by transmitting the biphase input signal 188 through the delay circuit 180.

An end pulse output 254 is produced at point Y on output terminal 162 signifying the end of a word or character group of information pulses, by the output of the end comparator counter 84 when counter ramp signal 220 exceeds the termination space reference level 216' at point 256. This occurs only during the termination space at the end of the word, because such termination space is at least one and one-half times the width of the last data bit of the group. Its greater width insures that a termination space rather than a bit, such as the first zero bit of the biphase mark signal, produces the end pulse 254''.

As stated previously, the end pulse 254 is transmitted through conductor 164 to reset the input memory flip-flops 122 and 126 thereby producing the counter reset signal 204 at the $\overline{Q}$ output of flip-flop 126. This resets the counters 80, 82 and 84 and prevents them from counting or otherwise changing state until receipt of the next group of biphase input pulses 188. At the same time, the In Process signal 206 is terminated due to the resetting of flip-flop 122. It should be noted that last time reference counter signal 212' and the last bit counter signal 218' reach a higher amplitude during the termination space because of the longer duration of such space.

Reference is made to my copending U. S. patent application Ser. No. 158,799 for a more detailed description of the operation of the comparator counters 82 and 84, as well as the operation of the bistable multivibrator flip-flop circuits. However, unlike my previous invention, the present demodulator circuit produces an output pulse 236 at the last stage of the bit comparator counter 82 for each data bit when bit comparator counter signal 218 exceeds the reference voltage level 216 at the end of such data bit. This bit counter output signal 236 is then applied to the discriminator circuit 86 to determine whether the data bit contains an irregular transition to identify such bit as a one or a zero. The discriminator indicates the nature of the data bit by the discriminator data output signal 243 which switches the output memory flip-flop 96 to produce binary output signals at output terminals 100, 102, 182 and 184 which are not biphase signals but are NRZ or RZ signals of a different binary code than the biphase input signals applied to input terminal 104. In this manner the biphase input signals are demodulated even though they are nonsynchronous and have a variable bit rate by using the dynamic time reference technique in which the time reference counter 80 measures the width of the immediately preceding bit and provides a time reference voltage which is compared by bit comparator counter 82 and the discriminator 86 with the width of the next succeeding bit to identify the binary nature of such bit.

While it is not shown in FIG. 4, the time reference voltage level 216 can vary, as indicated by arrow 258, for each successive bit comparator counter ramp signal 218. Also, it should be noted that the slope of the bit comparator counter signal 218 is greater than that of the time reference counter signal 216 because it counts at a faster rate $f_o$ than the counting frequency $3/4f_o$ of the time reference counter. However, the end comparator counter ramp signal 220 has a lower slope than that of the time reference counter signal since it counts at a slower rate of $f_{o/2}$. As a result, the bit comparator counter signal 218, after the first ramp, always exceeds the time reference level 216 during each information bit, while the end comparator counter signal 220 never exceeds its time reference level 216' during the information bits but only does so during the termination space due to its greater width.

As shown by the top three lines of FIG. 4, the biphase input signal 188 may be a biphase mark signal so that it contains the binary information of 01101 between the preamble and termination bits. However, the biphase input signal 188 can also be a biphase space signal in which case it contains binary information of 10010. Alternatively, the 10010. input signal 188 may be a biphase level signal in which case it contains the binary information of 00011. Thus, the demodulator apparatus of FIG. 3 can demodulate any of the biphase signals of FIG. 2.

In conclusion, it will be obvious to those having ordinary skill in the art that many changes may be made in the details of the above-described preferred embodiment of the present invention without departing from the spirit of the invention. Therefore, the scope of the present invention should only be determined by the following claims.

I claim:

1. A nonsynchronous demodulator apparatus in which the improvement comprises:

input means for supplying to the input of the demodulator a series binary input signal of two level nonsynchronous binary encoded input bits of biphase type having a non-uniform bit rate;

reference means for determining the width of successive ones of said input bits, and for producing a time reference signal corresponding to the width of each input bit so that the value of said reference signal is automatically changed in response to changes in the width of said input bits due to variations in the bit rate;

comparator means including a discriminator means, for comparing the reference signal corresponding to the width of the next preceding input bit against the time interval of the biphase binary information portion of the next succeeding bit to determine whether said succeeding bit is a binary one or a binary zero; and output means connected to said discriminator means for producing at the output of the demodulator a series binary output signal of output bits corresponding to said input bits but of a different code.

2. A demodulator apparatus in accordance with claim 1 in which the discriminator means discriminates between regular and irregular transitions in the biphase binary input signal and applies timing pulses to said reference means which correspond only to said regular transitions in order to produce said time reference signal, and for transmitting information pulses to said output means corresponding only to irregular transitions to produce said output signal.

3. A demodulator apparatus in accordance with claim 2 in which the output means includes an output memory means having at least one bistable multivibrator which is triggered by said information pulses in response to said irregular transitions.

4. A demodulator apparatus in accordance with claim 2 in which the reference means includes a first digital counter and the comparator means includes a second digital counter, and a standard pulser means for applying to the inputs of said first and second counters standard pulses of a predetermined frequency with the standard pulses applied to said first counter being of a lower frequency than those applied to the second counter.

5. A demodulator apparatus in accordance with claim 4 which also includes a transfer means for transferring said reference signal from said first counter to said second counter upon receipt of the next input bit to preset said second counter to the complement voltage value of said reference signal so that said second counter produces an output only after counting a number of standard pulses exceeding said complement of the reference signal previously counted in the first counter, and means for setting said first counter to zero after a time delay with respect to said transfer.

6. A demodulator apparatus in accordance with claim 5 in which the input means includes a sequential control means which is operated in response to the receipt of an input pulse corresponding to a regular transition of said input signal for disabling the first counter and actuating the transfer means, for resetting said first counter to zero after a first delay and for actuating the discriminator means after a second delay in the sequence mentioned.

7. A demodulator apparatus in accordance with claim 6 in which the sequential control means includes a first monostable multivibrator connected between its input and the reset terminals of the first counter, and a second monostable multivibrator connected between the output of said first multivibrator and said discriminating means.

8. A demodulator apparatus in accordance with claim 7 in which the input memory means includes a pair of interconnected bistable multivibrators connected to a first gate means for transmitting input pulses corresponding to the beginning and end of a preamble bit directly to the sequential control means, and input pulses corresponding to other regular transitions of the input signal through a second gate means to said control means when said second gate means is enabled by the discriminator means.

9. A demodulator apparatus in accordance with claim 4 in which the discriminator means includes a bistable multivibrator triggered by the output of the second counter and reset after the next regular transition of the input signal to produce a disabling signal which is applied to one input of an And gate having its other input connected to receive input pulses corresponding to regular and irregular transitions of the input signal so that only the irregular transition pulses occurring before the second counter output are transmitted through said And gate to the output of the discriminator means to provide the information pulses.

10. A demodulator apparatus in accordance with claim 9 in which the comparator means also includes a third digital counter connected to the output of said standard pulser means for applying to said third counter standard pulses of a lower frequency than those applied to the first counter, said third counter also being connected to the output of said transfer means and producing an End pulse at the end of each group of input bits corresponding to a word or character when the interval between successive transitions of the input signal exceeds by a predetermined amount proportional to the width of the last bit of said group.

11. A demodulator apparatus in accordance with claim 10 in which the input means includes a input memory means for resetting all of the counters upon receipt of said End pulse and thereafter enabling said counters in response to the next regular transition of the input signal.

12. A demodulator apparatus in accordance with claim 1 in which the input means provides said input signal with bits arranged in separate groups of bits with each group including a preamble bit at the beginning, a plurality of information bits and a termination space at the end of said group, said preamble bit having a width substantially the same as that of the first information bit and said termination space having an interval at least 1 ½ times the width of the last information bit of the group.

13. A demodulator apparatus in accordance with claim 1 in which the input means includes an optical reader, a label having a plurality of light reflective and nonreflective bars arranged in binary code, and means for scanning said reader across said bars at a nonuniform rate to produce said input signal.

14. A demodulator apparatus in accordance with claim 8 in which the binary coded information on said label includes the price of an item to which the label is attached.

15. A demodulator apparatus in accordance with claim 1 in which the output means is connected to a digital computor.

16. A demodulator apparatus in accordance with claim 1 in which the input means includes a magnetic reader, a magnetic record of binary information, and means for scanning said reader across said record at a nonuniform rate to produce said input signal.

17. A demodulator apparatus in accordance with claim 1 which also includes means for producing bit sync output pulses that are synchronized with the information bits of the output signal.

* * * * *

UNITED STATES PATENT OFFICE
CERTIFICATE OF CORRECTION

Patent No. 3,737,632 Dated June 5, 1973

Inventor(s) ROLAND O. BARNES

It is certified that error appears in the above-identified patent and that said Letters Patent are hereby corrected as shown below:

Column 1, line 16, after "APPARATUS" insert --, and the present application is a continuation-in-part of this application.

Column 4, line 48, "ckeckout" should be --checkout--;

Column 8, line 43, "to point C" should be --at point C--;

Column 8, line 55, "in high" should be --is high--;

Column 8, line 63, "present" should be --preset--;

Column 10, line 19, "o" should be --0--;

Column 10, line 57, "the" should be --The--;

Column 12, line 67, "10010" should read -- biphase --.

Signed and sealed this 12th day of February 1974.

(SEAL)
Attest:

EDWARD M.FLETCHER,JR.
Attesting Officer

C. MARSHALL DANN
Commissioner of Patents